US011425150B1

(12) United States Patent
Emanuel et al.

(10) Patent No.: US 11,425,150 B1
(45) Date of Patent: Aug. 23, 2022

(54) LATERAL MOVEMENT VISUALIZATION FOR INTRUSION DETECTION AND REMEDIATION

(71) Applicant: Bank of America Corporation, Charlotte, NC (US)

(72) Inventors: Leslie Charles Emanuel, Bridgend (GB); Srihari Konakanchi, Potters Bar (GB); Stephen Charles Aldridge, West Sussex (GB); Joe Tao Yeung Wong, London (GB)

(73) Assignee: Bank of America Corporation, Charlotte, NC (US)

( * ) Notice: Subject to any disclaimer, the term of this patent is extended or adjusted under 35 U.S.C. 154(b) by 404 days.

(21) Appl. No.: 16/739,809

(22) Filed: Jan. 10, 2020

(51) Int. Cl.
*H04L 9/40* (2022.01)
*G06N 5/04* (2006.01)
*G06N 20/00* (2019.01)

(52) U.S. Cl.
CPC .......... *H04L 63/1416* (2013.01); *G06N 5/04* (2013.01); *G06N 20/00* (2019.01)

(58) Field of Classification Search
CPC ........ H04L 63/1408–1425; G06N 5/04; G06N 20/00–20
See application file for complete search history.

(56) References Cited

U.S. PATENT DOCUMENTS

| | | |
|---|---|---|
| 7,624,448 B2 | 11/2009 | Coffman |
| 8,762,298 B1 | 6/2014 | Ranjan et al. |
| 9,185,124 B2 | 11/2015 | Chakraborty |
| 9,679,125 B2 | 6/2017 | Bailor et al. |
| 9,753,960 B1 | 9/2017 | Troyanovsky |
| 9,825,979 B2 | 11/2017 | Neil et al. |
| 9,838,264 B2 | 12/2017 | Daniel et al. |
| 9,846,780 B2 | 12/2017 | Tonn et al. |
| 9,886,581 B2 | 2/2018 | Olson et al. |
| 10,176,445 B2 | 1/2019 | Venna et al. |
| 10,313,382 B2 | 6/2019 | Noel et al. |
| 10,320,827 B2 | 6/2019 | Crabtree et al. |
| 2013/0055404 A1 | 2/2013 | Khalili |
| 2017/0063899 A1* | 3/2017 | Muddu ................. G06F 3/0482 |
| 2017/0244742 A1 | 8/2017 | Helmsen et al. |
| 2021/0136101 A1* | 5/2021 | Ben-Yosef .......... H04L 63/1433 |

FOREIGN PATENT DOCUMENTS

JP  2004086241 A  * 3/2004

* cited by examiner

*Primary Examiner* — Matthew T Henning
(74) *Attorney, Agent, or Firm* — Banner & Witcoff, Ltd.

(57) ABSTRACT

Aspects of the disclosure relate to visualization of lateral movements of an intruder on a network by connecting to computers and/or resources under investigation. A first computer is identified for investigation. Logs regarding incoming and outgoing connections to the computer are extracted and can be prefiltered based on specific IDs or other criteria. Maps of incoming and outgoing connections are stored in memory along with event information. Each subsequent computer to which the computer connected or resource accessed is identified. The map is updated based on logs from that computer or resource. A graphical image showing each applicable host, its connections, the chronology, and/or contextual information is generated and displayed. Individual hosts and other displayed data can be user-selectable to drill down and/or provide additional information. The process can repeat until all hosts, from patient zero to all endpoints, have been identified and rendered.

20 Claims, 19 Drawing Sheets

| Lateral Movement Spreadsheet Report - 600 | | | | | | | | |
|---|---|---|---|---|---|---|---|---|
| Log Entry | User ID | Compuer ID - Connected | Request Type | Requested Computer ID | Requested Resource | Request Status | Date/Time | Activity Log |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |

| | |
|---|---|
| Type : | Audit Success |
| Date : | 27/02/2019 |
| Time : | 15:38:56 |
| Event : | 4648 |
| Source : | Microsoft-Windows-Security-Auditing |
| Category : | Logon |
| User : | N/A |
| Computer : | pc1.an.other.com |

Description:
A logon was attempted using explicit credentials.
Subject:
    Security ID:    S-1-5-21-1454641165-2167807219-1821574931-7979865
    Account Name:    user1
    Account Domain:    AN
    Logon ID:    0x7146d5ad
    Logon GUID:    {00000000-0000-0000-0000-000000000000}
Account Whose Credentials Were Used:
    Account Name:    user2
    Account Domain:    an.other.com
    Logon GUID:    {00000000-0000-0000-0000-000000000000}
Target Server:
    Target Server Name:    pc2.an.other.com
    Additional Information:    cifs/pc2.an.other.com
Process Information:
    Process ID:    0x4
    Process Name:    ?
Network Information:
    Network Address:    -
    Port:    -

Type :              Audit Success
Date :              27/02/2019
Time :              16:40:29
Event :             4648
Source :            Microsoft-Windows-Security-Auditing
Category :          Logon
User :              N/A
Computer :          pc1.an.other.com
Description:
A logon was attempted using explicit credentials.
Subject:
        Security ID:            S-1-5-21-1454641165-2167807219-1821574931-7979865
        Account Name:           user1
        Account Domain:         AN
        Logon ID:               0x72259d17
        Logon GUID:             {00000000-0000-0000-0000-000000000000}
Account Whose Credentials Were Used:
        Account Name:           user2
        Account Domain:         an.other.com
        Logon GUID:             {90C00C13-93D3-A306-84F4-3D03430983AE}
Target Server:
        Target Server Name:     pc2.an.other.com
        Additional Information: RPCSS/pc2.an.other.com
Process Information:
        Process ID:             0x3e8
        Process Name:           C:\Windows\System32\svchost.exe
Network Information:
        Network Address:        -
        Port:                   -
```

| | |
|---|---|
| Type : | Audit Success |
| Date : | 27/02/2019 |
| Time : | 16:40:29 |
| Event : | 4648 |
| Source : | Microsoft-Windows-Security-Auditing |
| Category : | Logon |
| User : | N/A |
| Computer : | pc1.an.other.com |

Description:
A logon was attempted using explicit credentials.
Subject:
    Security ID:    S-1-5-21-1454641165-2167807219-1821574931-7979865
    Account Name:    user1
    Account Domain:    AN
    Logon ID:    0x72259d17
    Logon GUID:    {00000000-0000-0000-0000-000000000000}
Account Whose Credentials Were Used:
    Account Name:    user2
    Account Domain:    an.other.com
    Logon GUID:    {90C00C13-93D3-A306-84F4-3D03430983AE}
Target Server:
    Target Server Name:    pc2.an.other.com
    Additional Information:    host/pc2.an.other.com
Process Information:
    Process ID:    0x1208
    Process Name:    C:\Windows\System32\dllhost.exe
Network Information:
    Network Address:    -
    Port:    -

| | |
|---|---|
| Type : | Audit Success |
| Date : | 27/02/2019 |
| Time : | 17:17:16 |
| Event : | 4648 |
| Source : | Microsoft-Windows-Security-Auditing |
| Category : | Logon |
| User : | N/A |
| Computer : | pc1.an.other.com |

Description:
A logon was attempted using explicit credentials.
Subject:
    Security ID:                  S-1-5-21-1454641165-2167807219-1821574931-7979865
    Account Name:            user1
    Account Domain:          AN
    Logon ID:                     0x72c39213
    Logon GUID:                 {00000000-0000-0000-0000-000000000000}
Account Whose Credentials Were Used:
    Account Name:            user2
    Account Domain:          an.other.com
    Logon GUID:                 {00000000-0000-0000-0000-000000000000}
Target Server:
    Target Server Name:     pc3.an.other.com
    Additional Information:  host/pc3.an.other.com
Process Information:
    Process ID:                 0x4450
    Process Name:            C:\Windows\System32\dllhost.exe
Network Information:
    Network Address:        -
    Port:                           -

| | |
|---|---|
| Type : | Audit Success |
| Date : | 27/02/2019 |
| Time : | 17:24:17 |
| Event : | 4648 |
| Source : | Microsoft-Windows-Security-Auditing |
| Category : | Logon |
| User : | N/A |
| Computer : | pc1.an.other.com |

Description:
A logon was attempted using explicit credentials.
Subject:
    Security ID:    S-1-5-21-1454641165-2167807219-1821574931-7979865
    Account Name:    user1
    Account Domain:    AN
    Logon ID:    0x72e7af2b
    Logon GUID:    {00000000-0000-0000-0000-000000000000}
Account Whose Credentials Were Used:
    Account Name:    user2
    Account Domain:    an.other.com
    Logon GUID:    {A6EB2A0E-22E9-61A0-8A69-59C3F9B3F4A9}
Target Server:
    Target Server Name:    pc3.an.other.com
    Additional Information:    RPCSS/pc3.an.other.com
Process Information:
    Process ID:    0x3e8
    Process Name:    C:\Windows\System32\svchost.exe
Network Information:
    Network Address:    -
    Port:    -

FIG. 12

```
                                        1300
Type :            Audit Success
Date :            27/02/2019
Time :            15:38:56
Event :           4624
Source :          Microsoft-Windows-Security-Auditing
Category :        Logon
User :            N/A
Computer :        pc2.an.other.com
Description:
An account was successfully logged on.
Subject:
        Security ID:              S-1-0-0
        Account Name:             -
        Account Domain:           -
        Logon ID:                 0x0
Logon Information:
        Logon Type:               3
        Restricted Admin Mode:    (null)
        Virtual Account:          (null)
        Elevated Token:           (null)
Impersonation Level:              (null)
New Logon:
        Security ID:              S-1-5-21-1454641165-2167807219-1821574931-10772939
        Account Name:             user2
        Account Domain:           AN
        Logon ID:                 0x359bc23c
        Linked Logon ID:          (null)
        Network Account Name:     (null)
        Network Account Domain:(null)
        Logon GUID:               {325CE999-7832-EB16-68E3-44451F3C6A86}
Process Information:
        Process ID:               0x0
        Process Name:             -
Network Information:
        Workstation Name:         ?
        Source Network Address:   192.168.1.1
        Source Port:              53470
Detailed Authentication Information:
        Logon Process:            Kerberos
        Authentication Package:   Kerberos
        Transited Services:       -
        Package Name (NTLM only):    -
        Key Length:               0
```

FIG. 13

```
                                        1400
Type :              Audit Success
Date :              27/02/2019
Time :              16:40:29
Event :             4624
Source :            Microsoft-Windows-Security-Auditing
Category :          Logon
User :              N/A
Computer :          pc2.an.other.com
Description:
An account was successfully logged on.
Subject:
        Security ID:            S-1-0-0
        Account Name:           -
        Account Domain:         -
        Logon ID:               0x0
Logon Information:
        Logon Type:             3
        Restricted Admin Mode:  (null)
        Virtual Account:        (null)
        Elevated Token:         (null)
Impersonation Level:            (null)
New Logon:
        Security ID:            S-1-5-21-1454641165-2167807219-1821574931-10772939
        Account Name:           user2
        Account Domain:         AN
        Logon ID:               0x36e5637d
        Linked Logon ID:        (null)
        Network Account Name:   (null)
        Network Account Domain:(null)
        Logon GUID:             {10918BA4-808C-3F90-D9BA-F9503C6C39E1}
Process Information:
        Process ID:             0x0
        Process Name:           -
Network Information:
        Workstation Name:       ?
        Source Network Address: 192.168.1.1
        Source Port:            54578
Detailed Authentication Information:
        Logon Process:          Kerberos
        Authentication Package: Kerberos
        Transited Services:     -
        Package Name (NTLM only):   -
        Key Length:             0
```

FIG. 14

```
                                         1500
Type :           Audit Success
Date :           27/02/2019
Time :           16:40:29
Event :          4624
Source :         Microsoft-Windows-Security-Auditing
Category :       Logon
User :           N/A
Computer :       pc2.an.other.com
Description:
An account was successfully logged on.
Subject:
         Security ID:          S-1-0-0
         Account Name:         -
         Account Domain:       -
         Logon ID:             0x0
Logon Information:
         Logon Type:           3
         Restricted Admin Mode: (null)
         Virtual Account:      (null)
         Elevated Token:       (null)
Impersonation Level:           (null)
New Logon:
         Security ID:          S-1-5-21-1454641165-2167807219-1821574931-10772939
         Account Name:         user2
         Account Domain:       AN
         Logon ID:             0x36e56645
         Linked Logon ID:      (null)
         Network Account Name: (null)
         Network Account Domain:(null)
         Logon GUID:           {10918BA4-808C-3F90-D9BA-F9503C6C39E1}
Process Information:
         Process ID:           0x0
         Process Name:         -
Network Information:
         Workstation Name:     ?
         Source Network Address: 192.168.1.1
         Source Port:          54582
Detailed Authentication Information:
         Logon Process:        Kerberos
         Authentication Package: Kerberos
         Transited Services:   -
         Package Name (NTLM only):  -
         Key Length:           0
```

FIG. 15

```
                                1600
Type :          Audit Success
Date :          27/02/2019
Time :          17:17:16
Event :         4624
Source :        Microsoft-Windows-Security-Auditing
Category :      Logon
User :          N/A
Computer :      pc3.an.other.com
Description:
An account was successfully logged on.
Subject:
        Security ID:            S-1-0-0
        Account Name:           -
        Account Domain:         -
        Logon ID:               0x0
Logon Information:
        Logon Type:             3
        Restricted Admin Mode:  (null)
        Virtual Account:        (null)
        Elevated Token:         (null)
Impersonation Level:            (null)
New Logon:
        Security ID:            S-1-5-21-1454641165-2167807219-1821574931-10772939
        Account Name:           user2
        Account Domain:         AN
        Logon ID:               0x32e1b65
        Linked Logon ID:        (null)
        Network Account Name:   (null)
        Network Account Domain:(null)
        Logon GUID:             {1FE01816-0CE7-6CE8-A41F-B1619F0C4AF7}
Process Information:
        Process ID:             0x0
        Process Name:           -
Network Information:
        Workstation Name:       ?
        Source Network Address: 192.168.1.1
        Source Port:            61708
Detailed Authentication Information:
        Logon Process:          Kerberos
        Authentication Package: Kerberos
        Transited Services:     -
        Package Name (NTLM only):       -
        Key Length:             0
```

FIG. 16

```
                                    1700
Type :              Audit Success
Date :              27/02/2019
Time :              17:24:18
Event :             4624
Source :            Microsoft-Windows-Security-Auditing
Category :          Logon
User :              N/A
Computer :          pc3.an.other.com
Description:
An account was successfully logged on.
Subject:
        Security ID:            S-1-0-0
        Account Name:           -
        Account Domain:         -
        Logon ID:               0x0
Logon Information:
        Logon Type:             3
        Restricted Admin Mode:  (null)
        Virtual Account:        (null)
        Elevated Token:         (null)
Impersonation Level:            (null)
New Logon:
        Security ID:            S-1-5-21-1454641165-2167807219-1821574931-10772939
        Account Name:           user2
        Account Domain:         AN
        Logon ID:               0x3520627
        Linked Logon ID:        (null)
        Network Account Name:   (null)
        Network Account Domain:(null)
        Logon GUID:             {01DE4464-46FC-CB71-C9B9-9CC7B331AB4F}
Process Information:
        Process ID:             0x0
        Process Name:           -
Network Information:
        Workstation Name:       ?
        Source Network Address: 192.168.1.1
        Source Port:            61842
Detailed Authentication Information:
        Logon Process:          Kerberos
        Authentication Package: Kerberos
        Transited Services:     -
        Package Name (NTLM only):   -
        Key Length:             0
```

FIG. 17

LATERAL MOVEMENT VISUALIZATION FOR INTRUSION DETECTION AND REMEDIATION

TECHNICAL FIELD OF DISCLOSURE

Aspects of the disclosure relate to processes and machines for electrical computers and digital processing systems regarding monitoring or scanning of software, data, and computers for lateral movement associated with intrusion detection.

BACKGROUND

Lateral movement refers to techniques that an intruder uses, after gaining initial access, to move deeper into a network in search of sensitive data and resources. After a successful network intrusion, the attacker attempts to navigate through the compromised environment and obtain increased privileges using various tools. Lateral movement allows a threat actor to avoid detection and retain access, even if discovered on the machine first infected (i.e., "patient zero").

After gaining initial access to a machine on a network, such as through a phishing attack or malware infection, the attacker impersonates a legitimate user and moves through multiple systems in the network. This involves gathering information about multiple systems, obtaining credentials, escalating privileges, and ultimately gaining access to the sensitive data and resources.

There are three main stages of lateral movement: reconnaissance, credential/privilege gathering and escalation, and gaining access to other computers in the network.

During reconnaissance, the attacker observes, explores and maps the network, its users, and devices. This map allows the intruder to understand host naming conventions and network hierarchies, identify operating systems, locate potential payloads, and acquire intelligence to make informed moves.

Threat actors deploy a variety of tools to discover where they are in the network, what they can get access to and what firewalls or other deterrents are in place. An attacker can leverage many external custom tools and open-source tools for port scanning, proxy connections and other techniques, but employing built-in Windows or support tools offer the advantage of being harder to detect.

Various built-in tools can be used during reconnaissance. For example, Netstat shows the machine's current network connections. This can be used for gaining knowledge about the network. IPConfig/IFConfig provides access to the network configuration and location information. ARP cache gives information about the IP address to physical address. This information can target individual machines inside the network. The Local Routing table displays communication paths for the connected host. PowerShell, a powerful command line and scripting tool, allows quick identification of network systems to which the user has local admin access.

Once the attacker has identified critical areas to access, the next step is gathering login credentials that will allow entry. To move through a network, an attacker needs valid login credentials. The term used for illegally obtaining credentials is called "credential dumping." One way to obtain these credentials is to trick users into sharing them by using social engineering tactics such as typosquatting and phishing attacks. Pass the Hash is another method of authenticating without having access to the user's password. This technique bypasses standard authentication steps by capturing valid password hashes that once authenticated allow the attacker to perform actions on local or remote systems. Pass the Ticket is a way of authenticating using Kerberos tickets. An intruder that has compromised a domain controller can generate a Kerberos "golden ticket" offline that remains valid indefinitely and can impersonate a user, even after a password reset. Tools like Mimikatz are used to steal cached plaintext passwords or authentication certificates from the memory of a compromised machine. They can then authenticate to other machines. Keylogging tools allow the attacker to capture passwords directly when an unsuspecting user enters them via the keyboard.

Regarding gaining access, performing internal reconnaissance and then bypassing security controls to compromise successive hosts can be repeated until the target data has been found and exfiltrated. And, as cyberattacks become more sophisticated, they often contain a strong human element. This is true for lateral movement, when an organization might face moves and countermoves from an adversary.

Once an attacker secures administrative privileges and gains deeper access into a network, malicious lateral movement can be very difficult to detect because it can appear to be "normal" network traffic. Also, a human attacker can change plans and deploy different techniques and tools based on the information collected. And when the adversary utilizes built-in system tools, detection becomes even harder. It is essential to find and remove these intruders quickly to avoid losses.

Breakout time is the time it takes for an intruder to move laterally into other systems in the network after initially compromising patient zero. This means an organization has a short period of time to detect, investigate, and/or remediate or contain the threat. If it takes longer, the intruder has a better chance of accessing or destroying critical data and resources.

Hence, speed is paramount. Companies need to quickly detect, investigate, and containing an intrusion within "breakout time." The longer an adversary is allowed move laterally over a protracted dwell time, the more likely an attack will eventually succeed.

Prior art attempts to detect, investigate, and contain intrusions are too slow because they are manually laborious. This disclosure addresses one or more shortcomings in the industry and provides improved lateral movement visualization for intrusion detection and remediation in "computer machines" and computer-executable "software and data" across "network(s)" as those terms are defined and used herein.

SUMMARY

Aspects of the disclosure provide effective, efficient, scalable, and convenient technical solutions that address and overcome the technical problems by providing visualization of and/or remediation for lateral movements associated with network intrusions. In various embodiments, this includes the automated collection of event and/or connection logs, processing and/or filtering of logs, and visual mapping of connections based within the context of identifying lateral movement within a computer network. It also provides the ability to identify other host logs and collect the data automatically or semi-automatically. It provides the ability to identify the initial infection vector (patient zero) and scale of intrusion within a short timeframe. It also provides the ability to visualize the journey of the lateral movement as an output quickly based on order, chronology, or other desired sorting. The capability of adding supplemental contextual information by cross referencing host data with other data sources to enrich the intelligence is also provided and may be triggered by user-selection of icons, connection lines, or other information in graphical images to drill down or supplement displayed information as desired.

In accordance with one or more embodiments, a security computer machine having a processor, secure non-volatile memory, and secure volatile memory can implement a computer-implemented method of visualizing an intruder's lateral movement in a network. After an initial security breach is detected and/or suspected, a first computer to investigate can be identified. The first computer can be identified automatically, or a user could identify the computer by name, IP address, or another identifier. The first computer has non-volatile memory that can include a first incoming log sector containing a first incoming log of computers that have connected to the first computer and a first outgoing log sector containing a first outgoing log of computers to which the first computer has connected. Individual components of the memory sectors can be adjacent to one another or distributed based on an allocation table The processor on the security computer machine can establish a first connection to the first computer. The processor can extract the first incoming log of computers that have connected to the first computer and the first outgoing log of computers to which the first computer has connected. Resources accessed can be included within these logs too. The processor can load a prefilter dataset for specific IDs or other desired criteria from the secure non-volatile memory. The dataset can filter the first incoming log and the first outgoing log.

The processor can map network computer connections based on the first incoming log and the first outgoing log into mapped data. The processor can store the mapped data into a database in the security non-volatile memory. The mapped data may include a list of computers and connections along with time and date information for the connections. Other event or connection data can be logged or mapped. The processor can render a graphical image to visualize the lateral movement on the network based on the mapped data and can store the image in the security volatile and/or non-volatile memory. The graphical image can contain icons or distinguishable shapes corresponding to hosts in the mapped data, and one or more lines—with or without arrowheads—in the graphical image can interconnect the hosts to illustrate incoming and outgoing connections to/from the hosts. Color coding or other customizations can optimize the graphical representation and facilitate quick analysis of the results.

The processor can repeat the process to investigate a second computer and subsequent computers to traverse all computers affected by lateral movement of the network intruder. The maps and renderings can be updated based on the subsequent investigations into the second and other computers.

In some embodiments, the graphical image can display lateral movement in chronological order. If desired, the image can display all lateral movements from patient zero to all endpoints of machines reached or data accessed in the network.

In some embodiments, contextual data regarding the hosts may be ingested into the security computer machine. The contextual data may include usernames, user permission, user entitlements, alerts or other information relevant to evaluating the scope of a security breach or network intrusion. The contextual data may be stored in a database or other structure, and may be stored on the security computer machine or in memory accessible by the security computer machine.

In some embodiments, the hosts, icons, lines, or other representations in the graphical image may be user selectable such as by a cursor and input from a computer mouse, trackpad, pen, or other input device. If desired, additional details can be provided for the hosts, icons, lines or other representations in a drill down fashion.

In some embodiments, the output of the lateral movement investigation can be provided in tabular format.

In some embodiments, remediation can be performed based on historical information regarding prior network intrusions, network best practices, security patches, and/or operating system or application updates. The remediation can be implemented on software, software configurations, permissions, access rights, or similar measures to prevent future network intrusions or stop the current intrusion. The remediation may be automatic, performed on demand, or at scheduled intervals, if desired. Machine learning may also identify remediations to be made or to determine how remediations should be implemented. The machine learning may be unsupervised, semi-supervised, supervised, or reinforced, as desired.

In accordance with one or more embodiments, a computer machine with a graphical user interface for visualizing lateral movement of an intrusion within a network can be used. The computer machine can include a processor for processing computer-executable instructions, volatile memory for storing temporary data, and non-volatile memory containing a series of modules implemented as computer-executable instructions. The modules can include an input module for identifying a first computer to investigate. A connection module can connect to the first computer. An extraction module can extract logs from the first computer and store the logs in the volatile memory. A connection mapping module can identify incoming connections to the first computer and outgoing connections from the first computer. A data storage module can store mapping results generated by the connection mapping module in the non-volatile memory. A rendering module can generate a graphical image of the lateral movement displayed in the graphical user interface. An identification module can identify one or more other computers to investigate. A contextual data module can load contextual data corresponding to the first computer and the one or more other computers to investigate.

In accordance with one or more embodiments, a non-transitory computer readable medium with computer executable instructions stored thereon executed by a processor on a security computer machine can create a graphical image visualizing lateral movement of an intrusion within a network. Input instructions can identify a first computer on the network to investigate. The input may be provided automatically or may be entered manually. Connection instructions can connect the security computer machine to the first computer. Extraction instructions can retrieve one or more logs on the first computer to identify incoming connections and outgoing connections. If desired, filtering instructions can prefilter the log for specific IDs or based on other criteria. Mapping instructions can generate a map based on the incoming connections and outgoing connections. Storage instructions can store the map, the incoming connections, the outgoing connections, time and date information, and other relevant details for the incoming connections and the outgoing connections. Rendering instructions can create a graphical image to visualize the lateral movement on the network based on the map. Identification instructions can identify one or more other computers to investigate based on the log(s). Report instructions can output results regarding visualization of the lateral movements.

Implementations of various aspects of this disclosure can vary depending on the preferences of system engineers and programmers, all of which would be within the knowledge of a person of ordinary skill in the art and could be implemented by such a person without undue experimentation by using custom and/or commercially available software. Although specific examples have been suggested for certain aspects of the disclosure, other implementations can be substituted without departing from the spirit of the invention in this disclosure and all are considered within the scope of the invention and claims.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 depicts a sample 2-dimensional report for visualization and remediation purposes regarding network intrusion and lateral movement in accordance with one or more example embodiments.

FIGS. 8-17 depict sample reports for visualization and remediation purposes regarding network intrusion and lateral movement in accordance with one or more example embodiments.

DETAILED DESCRIPTION

Figure 1A:
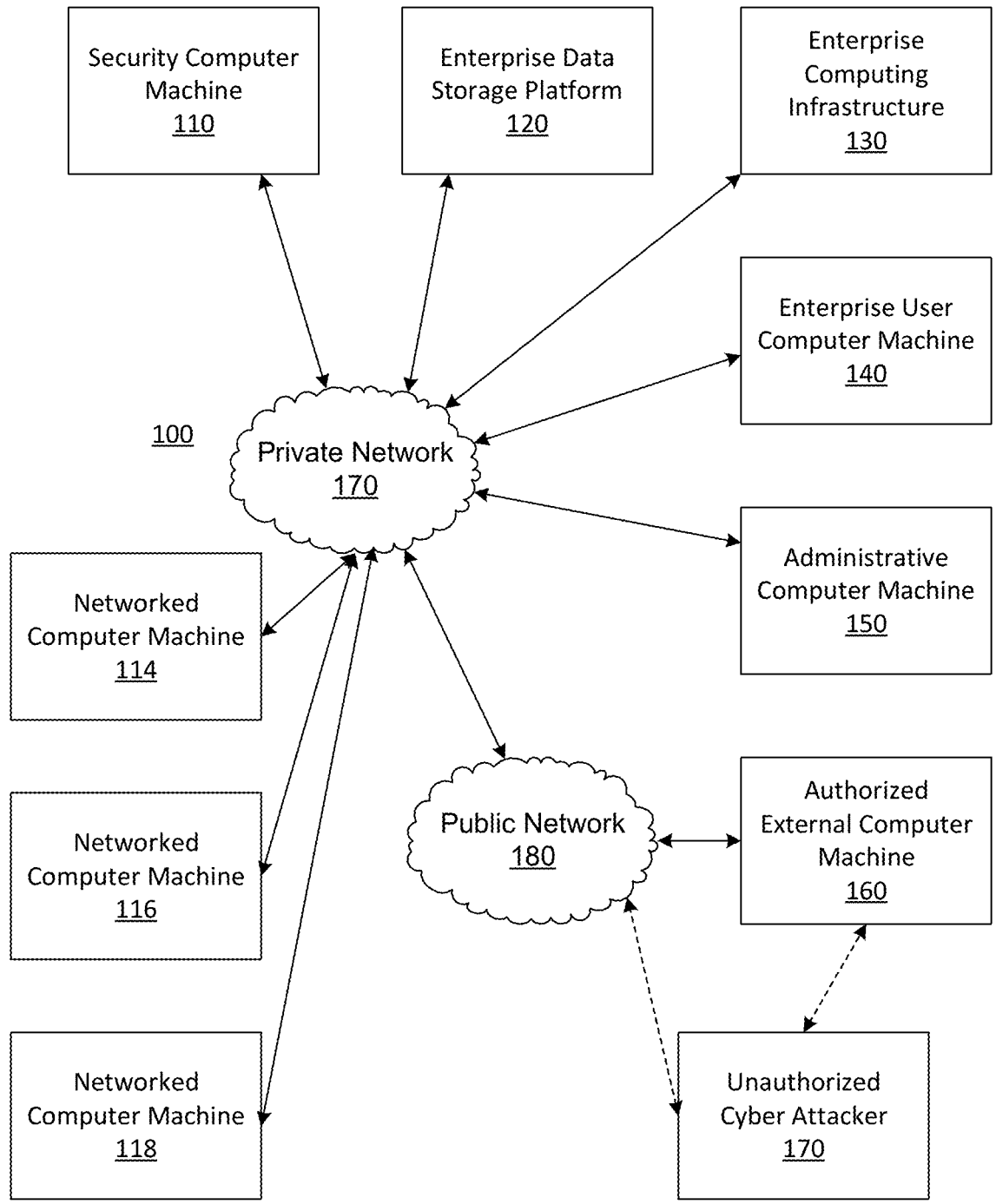
FIG. 1A depicts an illustrative computing environment, in accordance with one or more environments, for visualization and remediation of lateral movements associated with network intrusions.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (i.e., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, master computers, nodes, personal computers, portable electronic devices, servers, slave computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

FIG. 1A depicts an illustrative computing environment, under one or more environments, for visualization and remediation of lateral movements associated with network intrusions. Computing environment 100 may include one or more computer machines or systems. For example, computing environment 100 may include various computer machines such as one or more security computer machines 110 for performing intrusion detection, event logging, monitoring and investigation of lateral movements, preparation of visualization diagrams illustrating lateral movements, preparation of reports regarding lateral movements, machine learning, and/or performing remediation. These functions may be performed on the security computer machine 110 or any other computer machine 114, 116, 118, 130, 140, and/or 150 accessible in or from networks 170 and 180. One computer machine may perform all functionality or it may be distributed across one or more other machines or processes.

Computer environment 100 may also include an enterprise data storage platform 120, enterprise computing infrastructure 130, an enterprise user computing machine 140, an administrative computing machine 150, and an external computer system 160. Each element in computing environment 100 may include one or more computing machines and associated components operating computer software and data configured to perform one or more functions described herein.

In addition, and as illustrated in greater detail below, security computer machine(s) 110 may be configured to perform various distributed processing functions described and store, access, and/or act on enterprise or security data. Enterprise computing infrastructure 130 may include one or more computer machines and/or other computer components. In addition, and as illustrated in greater detail below, enterprise computing infrastructure 130 may be configured to provide various enterprise and/or back-office computing functions for an organization. Additionally or alternatively, enterprise computing infrastructure 130 may load data from enterprise data storage platform 120, manipulate and/or otherwise process such data, and return modified data and/or other data to enterprise data storage platform 120 and/or to other computer machines or systems in computing environment 100.

Enterprise user computing device 140 may be any type of computer machine and may be linked to and/or used by a specific enterprise user (who may, e.g., be an employee or other affiliate of an enterprise organization controlling and/or interacting with computer machine 110). Administrative computing device 150 may be any type of computer machine and may be linked to and/or used by an administrative user (who may, e.g., be a network administrator of an enterprise organization controlling and/or interacting with computer machine 110). Enterprise computer system 140 and external computer machine 160 may be any type of computer machines and may be linked to and/or used by one or more external users (who may, e.g., not be associated with an enterprise organization controlling and/or interacting with computer machine 110).

Computing environment 100 also may include one or more networks, which may be connected to security computer machine(s) 110, enterprise data storage platform 120, enterprise computing infrastructure 130, enterprise user computing device 140, administrative computing device 150, and external computer machine 160. For example, computing environment 100 may include a private network 170 (which may, e.g., interconnect security computer machine 110, enterprise data storage platform 120, enterprise computing infrastructure 130, enterprise user computing device 140, administrative computing device 150, and/or one or more other computer machines or systems, which may be associated with an organization), and public network 180 (which may, e.g., interconnect enterprise computer system 160 with private network 170 and/or one or more other computer machines, systems, public networks, subnetworks, and/or the like).

In one or more arrangements, computer machines and the other systems in computing environment 100 may be any computing device capable of providing a user interface, receiving input via the user interface, acting on the input, accessing or processing big data, controlling other computer machines and/or components thereof based on the input, and communicating the received input to one or more other computing machines. As noted above, and as illustrated in greater detail below, any and/or all of the computer machines of computer environment 100 may, sometimes, be special-purpose computing devices configured to perform specific functions.

Figure 1B:
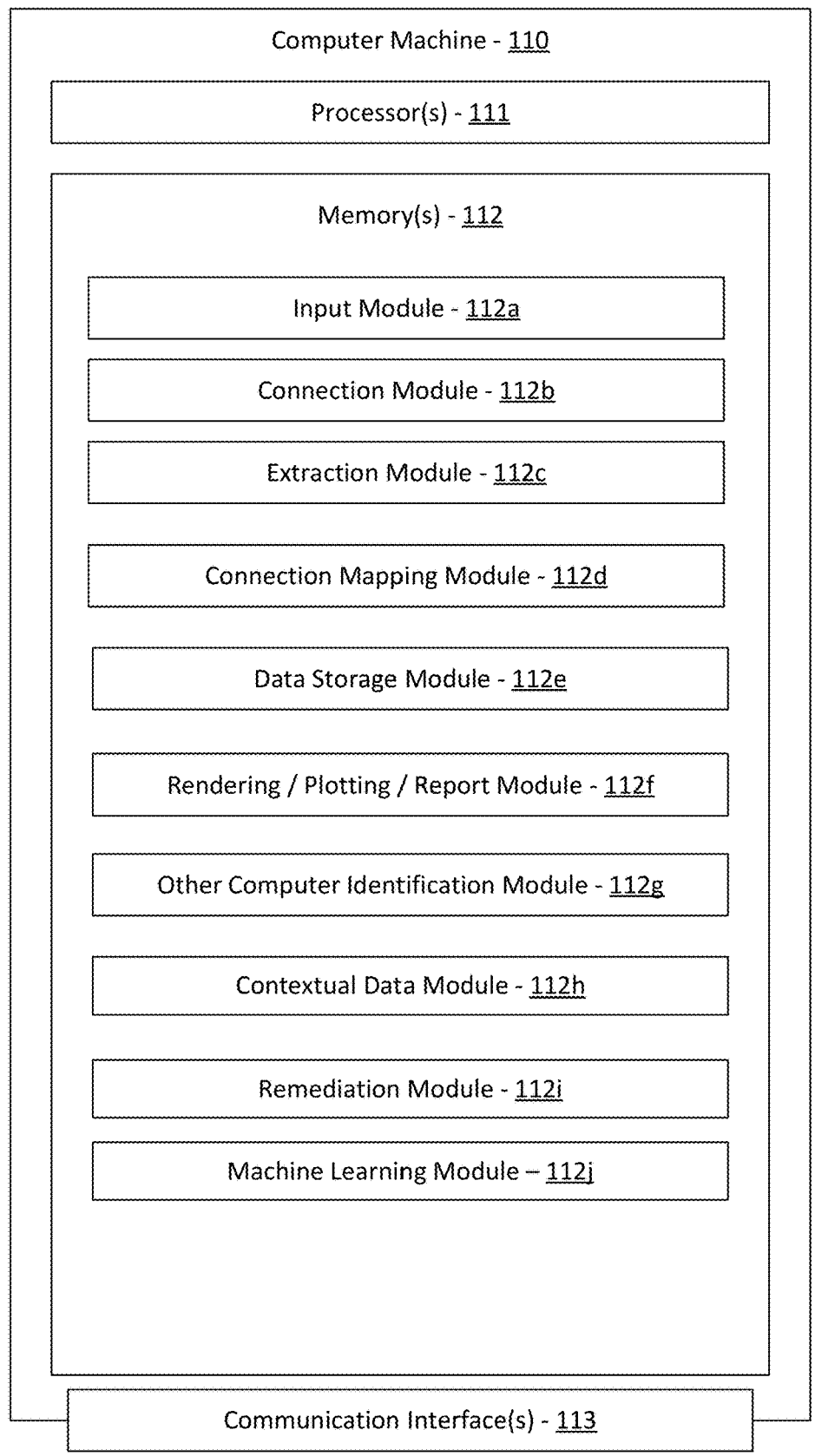
FIG. 1B depicts an illustrative computer machine, in accordance with one or more environments, containing processor(s), memory(s), inventive and operative computer software and data, and communication interface(s)

FIG. 1B depicts an illustrative computer machine, in accordance with one or more environments, containing processor(s), memory(s), inventive and operative computer software and data, and communication interface(s). One or more computer machines, such as, for example, security computer machine 110 may include one or more processors 111, memories 112, and communication interfaces 113. A data bus may interconnect processor 111, memory 112, and communication interface 113. Communication interface 113 may be a network interface configured to support communication between one or more computer machines in computer environment 100 and one or more networks (e.g., private network 170, public network 180, or the like). Memory 112 may be volatile or non-volatile, and may include computer software and data such as, for example, one or more program modules having instructions that when executed by processor 111 cause a computer machine, such as security computer machine 110, to perform one or more functions described and/or one or more databases or other distributed file systems that may store and/or otherwise maintain information which may be used by such program modules and/or processor 111. Sometimes, one or more program modules and/or databases may be stored by and/or maintained in different memory units of a security computer machine 110 and/or by different computing devices that may form and/or otherwise make up a collection of security computer machines 110.

For example, memory 112 may have, store, and/or include an input module 112a for receiving input on a computer machine to investigate; a connection module 112b for establishing connections to computers under investigation; an extraction module 112c for extracting data or event logs from a computer under investigation; a connection mapping module 112d for mapping connections attempted or established from the computer being investigated or for resources accessed; a data storage module 112e for storing any type of data associated with the investigation; a module 112f for rendering, plotting, reporting information regarding the investigation into lateral movements; a module 112g for identifying other computer machines to be investigated; a contextual data module 112h for importing data to put into context the lateral movements and to help visualize the intrusion; a remediation module 112i to remediate computer machines, software and/or data to prevent further network intrusions by the same or other threat actor; and a machine learning module 112j for supervised, unsupervised, semi-supervised, and/or reinforcement learning from one or more aspects of the visualization and remediation processes or for identification of additional computer to investigate, for storing the learned information, and implementing it to optimize the process.

Figure 2A:
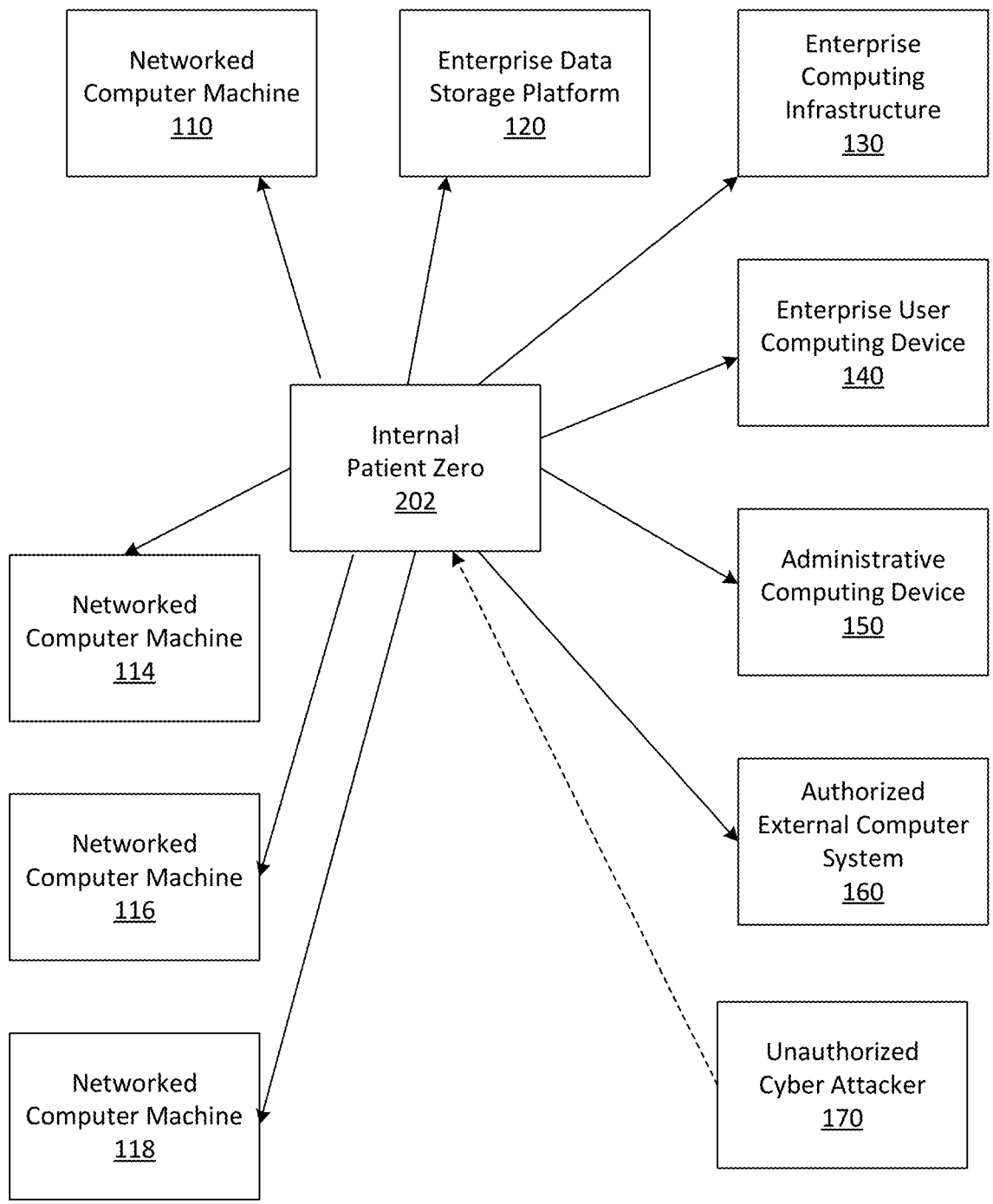
FIG. 2A depicts an illustrative topology for visualization and remediation regarding network intrusion and lateral movement based on initial intrusion into an internal computer machine to gain access to the network in accordance with one or more embodiments.
Figure 2B:
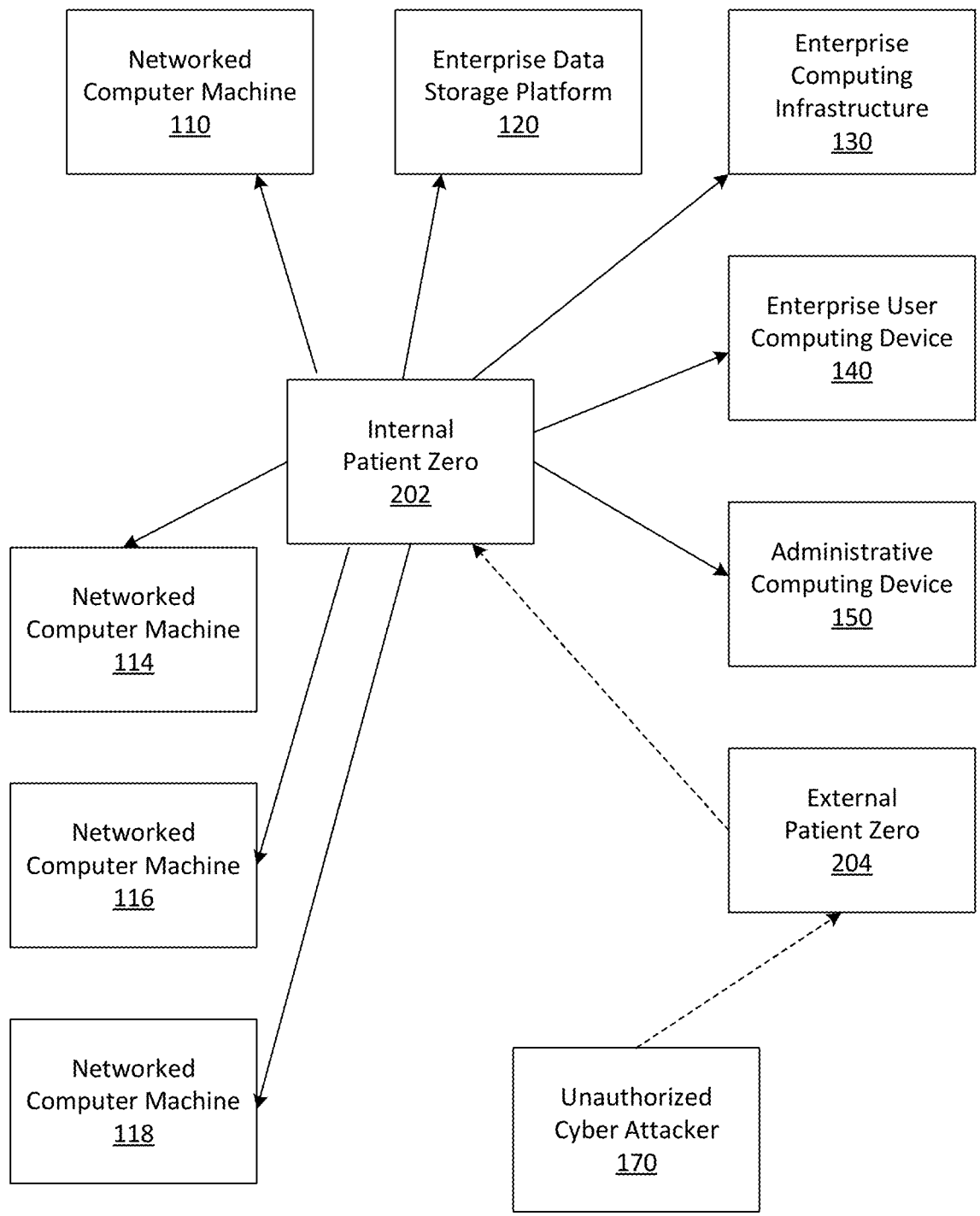
FIG. 2B depicts an illustrative topology for visualization and remediation regarding network intrusion and lateral movement based on initial intrusion into an external computer machine to gain access to the network in accordance with one or more embodiments.

FIGS. 2A and 2B depict an illustrative topology for visualization and remediation regarding network intrusion and lateral movement based on initial intrusion by a cyber attacker 170 into "patient zero," which may be an internal computer machine 202 inside a firewall in the network or an authorized external user 204 outside the firewall who has access to the network. After obtaining access to patient zero 202, 204, the attacker can impersonate a legitimate user and can attempt to move directly or indirectly through multiple systems 110, 114, 116, 118, 120, 130, 140, 150 in the network until the objective is reached. The attacker can attempt to do this by gathering information about various systems and users, obtaining credentials, escalating privileges, and ultimately gaining access to the sensitive data and resources.

Figure 3:
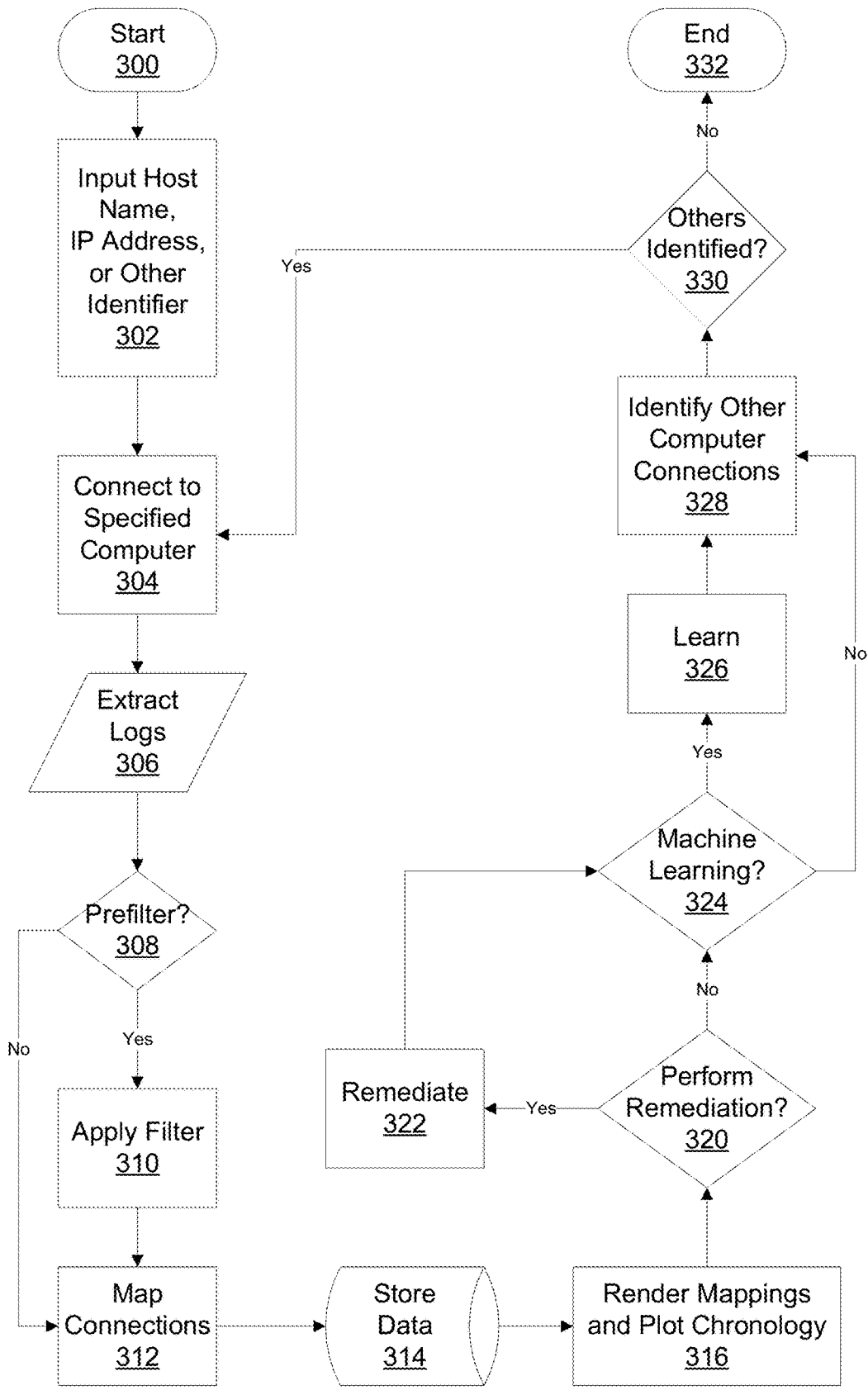
FIG. 3 depicts an illustrative method for visualization and remediation regarding network intrusion and lateral movement in accordance with one or more example embodiments.

FIG. 3 depicts an illustrative method for visualization and remediation regarding network intrusion and lateral movement in accordance with one or more example embodiments. The process can be started 300 on-demand by an IT professional or other authorized user, periodically as part of a set of scheduled processes, or automatically whenever an intrusion has been detected.

In step 302, the input module 112a of the inventive process and computer machine can accept input in the form of a computer host name, IP address or other identifier that denotes the initial computer machine to be investigated. The input may be manually or automatic. In step 304, connection module 112b can then automatically or semi-automatically (with user intervention) connect to the computer machine designated in step 302. In step 306, extraction module 112c can access memory in the computer under investigation to extract logs relating, for example, to system events, connection attempts and failures, user credential information, login attempts, group access controls, permissions, routing information, connected hardware, computer processes, accessed resources, and/or other type of desired logged information.

If desired, in step 308, the inventive process can optionally prefilter extracted logs or other data for specific event IDs or other criteria before or after log collection. If prefiltering is desired, one or more filters are applied to the logs or computer software or data in step 310.

In step 312, connections between computers and resources can be generated to map out and visualize lateral movements within the system. Various types of information may be included in the mappings to facilitate visualization such as, for example, computer names or IDs, machine types, IP addresses, domains, data and time information, whether the connection was established or refused, resources accessed, user credentials, user group membership, user group rights, etc. Mappings may be organized in chronological order, if desired, to locate patient zero and all end points reached or resources accessed within the system. In step 314, the mapped connections and related computer software and data can be stored in one or more databases, 2-dimensional arrays, dataframes, or other computer-readable memories or structures.

In step 316, the processed data, mapped connections, and any contextual information can be accessed and used to render the mappings into a graphical image for visualization. The chronology or sequence of events can be plotted to show the order in which the connections took place using a graph database visualization software.

In some embodiments, hosts can be represented as icons based on device type or as distinguishable shapes or icons with different attributes such as varying colors and/or text. Depicted connections between computers can be based on specific event IDs and one or more attributes from processed event logs. Connections between computers can be represented by lines connecting the hosts either with or without additional textual information such as connection type, connection success or failure, event number, data and time of attempted connection, etc. In some embodiments, the plotting of connections and computers can represent the chronology of connections to identify the journey of lateral movement and the initial infected host.

If sufficient information is available to perform remediation and it is desired (step 320), the remediation can be implemented in step 322 to adjust security measures to prevent a repeated intrusion or further instruction by an attacker into the breached system. The remediation could be selected based on historical information and successful remediation procedures or could be developed based on machine learning if desired (step 324) and stored in datasets in memory for future use or on demand as desired (step 326). Machine learning could also identify additional computers for further lateral movement investigation to optimize the process.

Skilled artisans will recognize that machine learning, as used herein, provides the ability to automatically learn from historical data experience regarding remediation and identification of computers for investigation without being explicitly programmed and/or with minimum programming. Learning can begin with observations or historical datasets, such as examples, direct experience, or instruction, to look for patterns in the data. Persons of skill in the art will recognize that any of a variety of traditional machine learning algorithms could be used with one or more embodiments in this disclosure for purposes related to remediation and/or identification of computers for investigation in the present disclosure including: supervised machine learning, semi-supervised machine learning, unsupervised machine learning, and reinforcement learning. All are considered within the spirit and scope of this disclosure.

Supervised machine learning algorithms can apply what has been learned to new data using labeled examples to predict future events. Starting from the investigation of a known training dataset, the learning algorithm can produce an inferred function to make predictions about the output values. Unsupervised machine learning algorithms can be used when the information used to train is not classified or labeled. Semi-supervised machine learning algorithms can use both labeled and unlabeled data for training, typically a small amount of labeled data and a large amount of unlabeled data. Reinforcement machine learning algorithms are learning methods that interact with the environment by producing actions and discovering errors or successes. Trial and error search and delayed reward are the most relevant characteristics of reinforcement learning. This method allows machines and software agents to automatically determine the ideal behavior within a specific context to maximize its performance. The particular machine learning algorithm(s) selected for use with one or more embodiments of this disclosure is a matter of design choice. At least initially, supervised machine learning can be used. As data is accumulated and the processes are optimized, other types of machine learning could also be used.

In step 328, the process can identify the other computers that had connected out or into the computer currently being investigated. Resources accessed can be identified too. If other computers are identified (step 330), the process can then be repeated by returning to step 304 as many times as necessary in order to trace all lateral movements within the breached system.

In some embodiments, each iteration of the investigation can update renders, plots, visualizations, chronologies, remediations, etc. based on new information identified during each subsequent investigation.

In some embodiments, one or more of the inventive methods may ingest and process other sources to enrich contextual data depicted in the desired visualization options.

Contextual data may be stored on the security computer machine, on another machine, or in another network accessible location.

In some embodiments, the depicted visualizations are user selectable such as, for example, by positioning a computer cursor on a computer or host. This can show additional attributes such as cross-referenced information from other databases and dataframes. This may include permission, users, entitlements, alerts, other relevant information, etc. If desired, these attributes can also be added into context, plotted and joined, and clicked on for additional context.

Visualization outputs can be distributed and routed to appropriate teams automatically or on demand and can be provided in printed or electronic format. Implemented and/or suggested remediations can also be shown. Data may also be output in tabular format corresponding to the visualization if desired.

Figure 4:
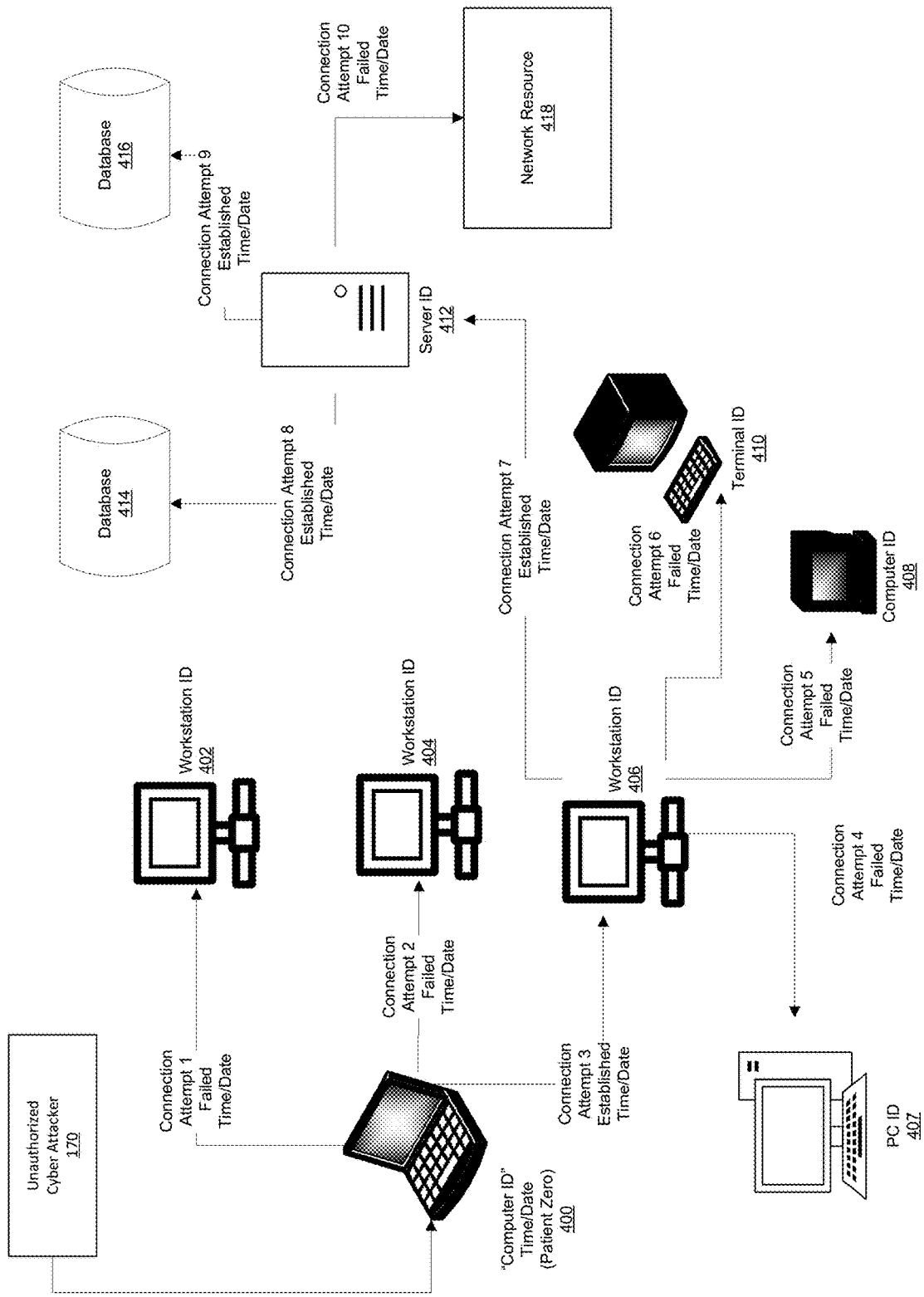
FIG. 4 depicts an illustrative visualization of a network intrusion showing lateral movement in accordance with one or more example embodiments.

FIG. 4 depicts an illustrative visualization of a network intrusion showing lateral movement in accordance with one or more example embodiments. Skilled artisans will appreciate that many different visualizations could represent and provide information regarding lateral movements within a network. All are considered within the spirit and scope of the invention. FIG. 4 is merely one such simplified example depicting a lateral movement visualization. In this example, different device types are represented by different icons and may be user selectable to drill down and provide additional related or contextual information.

As shown in the figure, an unauthorized cyber attacker 170 made a successful network intrusion based on a connection to patient zero 400. The name of the computer, its ID, or other identifying information can be shown. The time and date of the access can be identified.

From there, the subsequent connection attempts can be seen. In particular, "Connection Attempt 1" to Workstation 402 failed and "Connection Attempt 2" to Workstation 404 failed. However, in this example, "Connection Attempt 3" to Workstation 406 succeeded.

From Workstation 406, "Connection Attempt 4" to PC 407, "Connection Attempt 5" to Computer 408, and "Connection Attempt 6" to Terminal 410, each failed. However, Connection Attempt 7 to Server 412 succeeded, which allowed cyber attacker 170 to then attempt to access databases 414 and 416 and network resource 418.

Thus, the visualization allows security personnel to see the chronology and lateral movements of the network intruder and thus facilitates rapid response and remediation.

Figure 5:
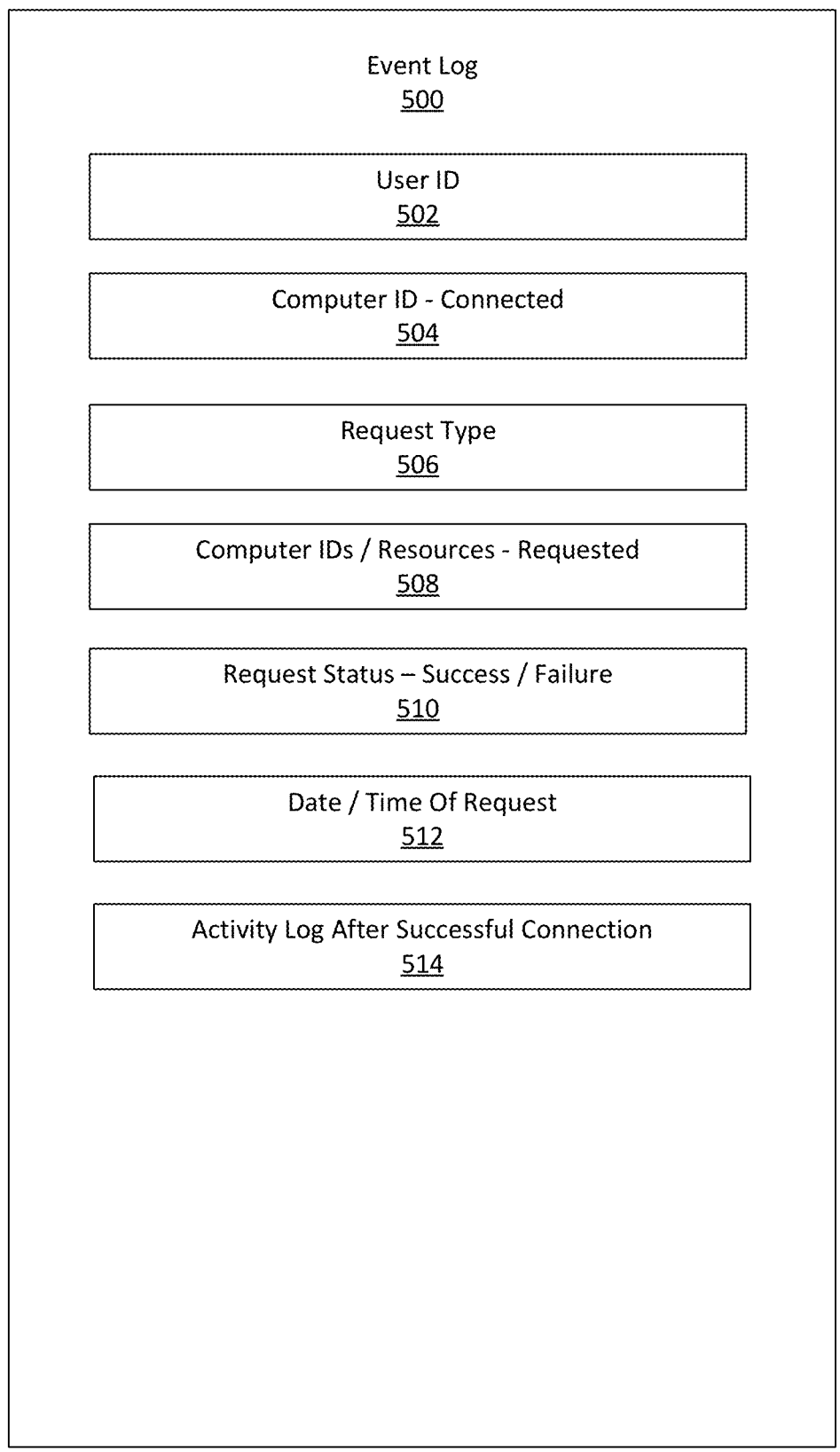
FIG. 5 depicts a sample event log that might be captured for visualization and remediation purposes with respect to network intrusion and lateral movement in accordance with one or more example embodiments.

FIG. 5 depicts a sample event log that might be captured for visualization and remediation purposes regarding network intrusion and lateral movement under one or more example embodiments. Each event log 500 could be stored in memory locally or on a network accessible computer-readable memory. Various types of information may be captured in the event logs such as, for example, user IDs and credentials 502, the ID of the computer to which the user was connected 504, and one or more requests made by the user along with the type 506 of request made. Each computer ID and/or resource requested or attempted to be accessed 508 can be stored. Whether each request succeeded or failed 510 can be recorded. Date and time logs 512 for each event can be captured. All activity that occurred after a successful connection can be logged. Event logs containing various types of information such as the foregoing may be stored on each computer to facilitate lateral movement investigations.

FIG. 6 depicts a sample 2-dimensional report for visualization and remediation purposes regarding network intrusion and lateral movement under one or more example embodiments. Information that can be included in the report may be the same or different that information in event log 500.

Figure 7:
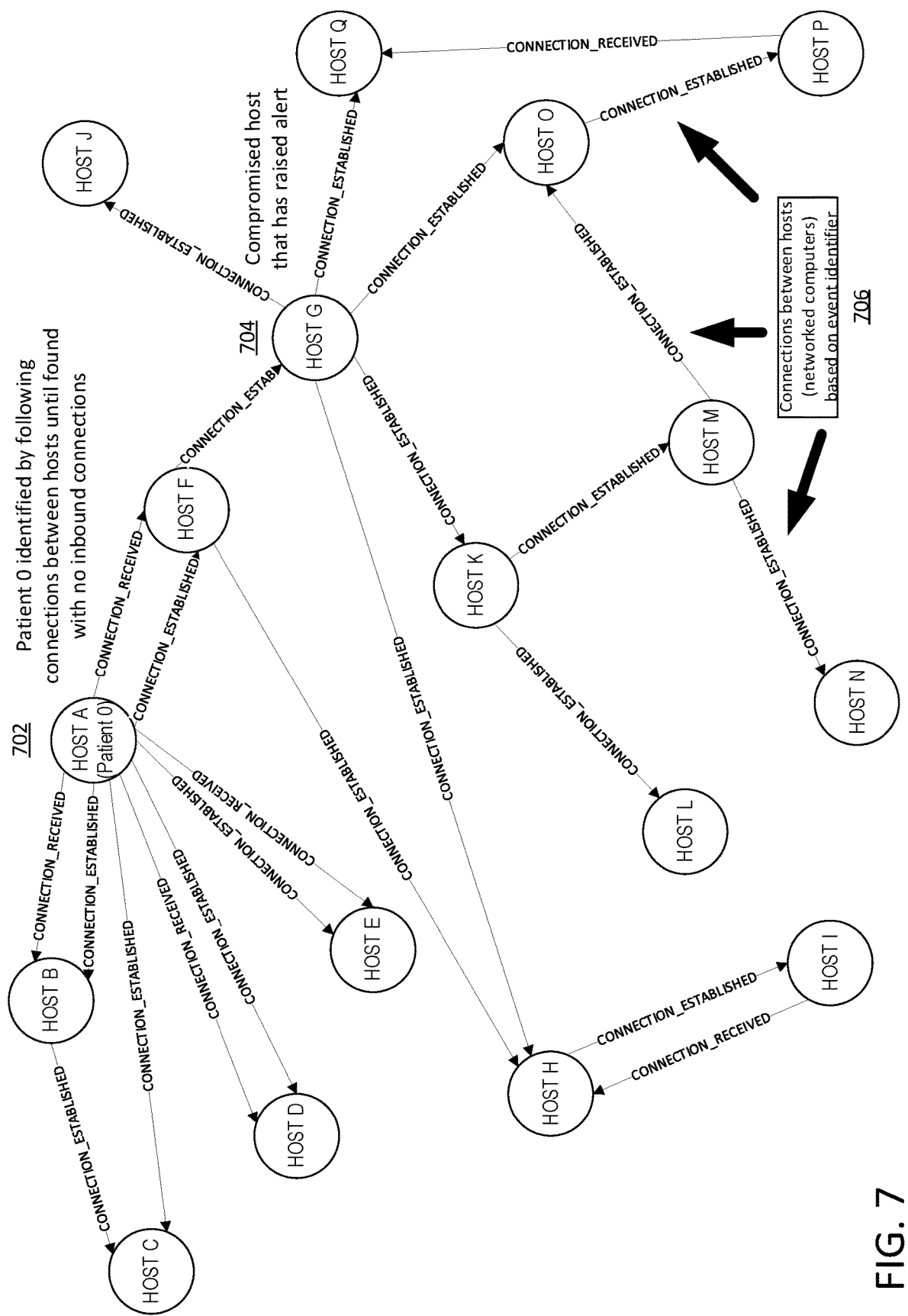
FIG. 7 depicts another illustrative visualization of a network intrusion showing lateral movement in accordance with one or more example embodiments.

FIG. 7 depicts another illustrative visualization of a network intrusion showing lateral movement under one or more example embodiments.

From a pseudo code perspective, one or more embodiments of this disclosure can be considered like shown below.

```
initialize
    set log=[evtx_file_path]
    set max_traversal_level=[number of levels]
    set max_logs=[total logs to probe]
    set levels_traversed=0
    set logs_fetched=0
    define Queue as Q
    Q.enqueue(log)
    loop when Q not empty
        if    (levels_traversed>max_traversal_level    OR
           logs_fetched>max_logs)
        then
           break loop
        log=Q.dequeue( )
        perform (routine.a)
           using [log]
           then
              yield [connected host] list
        mark log as processed
        for each [connected host] list
           do select [remote host]
           if ([remote host] not yet processed)
           then
              Q.enqueue([remote host])
    loop end
    build graph from all captured [log]
    apply ML/Graph algorithm
    find connected host path of max width
    find zero patient
define [routine.a]
    fetch [log]
    parse evtx to csv format
    filter on event type [4624,4648] and date range [t1] to [t2]
    find [connected host] connections
    return list[connected host]
```

One or more aspects of the disclosure may be embodied in computer-usable data or computer-executable software or instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines provided by one or more physical computing devices. In such arrangements, the functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more steps depicted in the illustrative figures may be performed in other than the recited order, and one or more depicted steps may be optional under aspects of the disclosure.

What is claimed is:

1. A computer-implemented method of visualizing lateral movement on a network by an intruder comprising the steps of:
   a) detecting, by a security computer machine, an initial security breach, said security computer machine having:
      i) a processor,
      ii) secure non-volatile memory, and
      iii) secure volatile memory;
   b) identifying, by the processor on the security computer machine, a first computer on the network that has been breached, said first computer having first non-volatile memory containing:
      i) a first incoming log sector containing a first incoming log of computers that have connected to the first computer,
      ii) a first outgoing log sector containing a first outgoing log of computers to which the first computer has connected;
   c) establishing a first connection, by the processor on the security computer machine, to the first computer;
   d) extracting, by the processor on the security computer machine from the first non-volatile memory,
      i) the first incoming log of computers that have connected to the first computer, and
      ii) the first outgoing log of computers to which the first computer has connected;
   e) loading, by the processor on the security machine into the security volatile memory, a prefilter dataset for specific IDs from the secure non-volatile memory;
   f) filtering, by the processor on the security machine, the first incoming log and the first outgoing log based on the prefilter dataset for the specific IDs;
   g) mapping, by the processor on the security machine, network computer connections based on the first incoming log and the first outgoing log into mapped data;
   h) storing, by the processor on the security machine, the mapped data into a database in the security non-volatile memory, said mapped data including a list of computers and connections along with time and date information for the connections;
   i) rendering, by the processor on the security machine, a graphical image to visualize the lateral movement on the network based on the mapped data, said graphical image stored in the security volatile memory, wherein:
      i) said graphical image contains icons or distinguishable shapes corresponding to hosts in the mapped data, and
      ii) one or more lines in the graphical image interconnect the hosts to illustrate incoming and outgoing connections;
   j) identifying, by the processor on the security machine, a second computer to investigate based on the mapped data, said second computer having second non-volatile memory containing:
      i) a second incoming log sector containing a second incoming log of computers that have connected to the second computer,
      ii) a second outgoing log sector containing a second outgoing log of computers to which the second computer has connected;
   k) establishing a second connection, by the processor on the security computer machine, to the second computer;
   l) extracting, by the processor on the security computer machine from the second non-volatile memory,
      i) the second incoming log of computers that have connected to the second computer, and
      ii) the second outgoing log of computers to which the second computer has connected;
   m) loading, by the processor on the security machine into the security volatile memory, a prefilter dataset for specific IDs from the secure non-volatile memory;
   n) filtering, by the processor on the security machine, the second incoming log and the second outgoing log based on the prefilter dataset for the specific IDs;
   o) updating the mapping, by the processor on the security machine, of the network computer connections based on the second incoming log and second outgoing log into updated mapped data;
   p) storing, by the processor on the security machine, the updated mapped data into the database in the security non-volatile memory;

q) updating the rendering, by the processor on the security machine, of the graphical image visualizing the lateral movement on the network based on the updated mapped data; and r) storing, by the processor on the security machine, the graphical image in the security non-volatile memory.

2. The computer-implemented method of visualizing lateral movement of claim 1 wherein the graphical image displays the lateral movement in chronological order.

3. The computer-implemented method of visualizing lateral movement of claim 2 wherein the chronological order is utilized to identify a patient zero computer.

4. The computer-implemented method of visualizing lateral movement of claim 3 further comprising the step of ingesting, by the processor on the security computer machine, contextual data regarding the hosts.

5. The computer-implemented method of visualizing lateral movement of claim 3 wherein each said host in the graphical image is user-selectable with a cursor.

6. The computer-implemented method of visualizing lateral movement of claim 5 further comprising the step of displaying in the graphical image, by the processor on the security computer machine, the contextual data in response to user-selection of the host with the cursor.

7. The computer-implemented method of visualizing lateral movement of claim 6 wherein the contextual data is ingested from a second database coupled to the network.

8. The computer-implemented method of visualizing lateral movement of claim 7 wherein the contextual data includes usernames.

9. The computer-implemented method of visualizing lateral movement of claim 7 wherein the contextual data includes user permissions.

10. The computer-implemented method of visualizing lateral movement of claim 7 wherein the contextual data includes user entitlements.

11. The computer-implemented method of visualizing lateral movement of claim 7 wherein the contextual data includes alerts.

12. The computer-implemented method of visualizing lateral movement of claim 7 further comprising the step of outputting in tabular format, by the processor on the security computer machine, information regarding said lateral movement.

13. The computer-implemented method of visualizing lateral movement of claim 3 further comprising the steps of:
a) loading, by the processor on the security computer machine, remediation information from the security non-volatile memory; and
b) remediating, by the processor on the security computer machine, one or more of said hosts based on the remediation information in order to prevent a future network intrusion.

14. The computer-implemented method of visualizing lateral movement of claim 3 further comprising the step of:
a) determining, by the processor on the security computer machine, results of the remediation; and
b) machine learning, by the processor on the security computer machine, based on the results of the remediation.

15. The computer-implemented method of visualizing lateral movement of claim 14 wherein the machine learning is supervised learning.

16. The computer-implemented method of visualizing lateral movement of claim 3 wherein the identification of the first computer is determined based on manual input of a computer name or IP address to be investigated.

17. The computer-implemented method of visualizing lateral movement of claim 16 wherein the steps are stored as computer-executable instructions in the security non-volatile memory in the security computer machine.

18. The computer-implemented method of visualizing lateral movement of claim 3 wherein the steps are stored as computer-executable instructions in the security non-volatile memory in the security computer machine.

19. A computer machine with a graphical user interface for visualizing lateral movement of an intrusion within a network comprising:
a) a processor for processing computer-executable instructions;
b) volatile memory for storing temporary data; and
c) non-volatile memory containing:
  i) an input module for identifying a first computer to investigate;
  ii) a connection module to connect to the first computer;
  iii) an extraction module to extract logs from the first computer and store the logs in the volatile memory;
  iv) a connection mapping module to identify incoming connections to the first computer and outgoing connections from the first computer;
  v) a data storage module for storing mapping results generated by the connection mapping module in the non-volatile memory;
  vi) a rendering module for generating a graphical image of the lateral movement that is displayed in the graphical user interface;
  vii) an identification module for identifying one or more other computers to investigate; and
  viii) a contextual data module for loading contextual data corresponding to the first computer and said one or more other computers to investigate,
wherein said modules are implemented as computer-executable instructions that are executed by the processor.

20. A non-transitory computer readable medium with computer executable instructions stored thereon executed by a processor on a security computer machine to create a graphical image visualizing lateral movement of an intrusion within a network, the method comprising:
a) input instructions to identify a first computer on the network to investigate;
b) connection instructions to connect the security computer machine to the first computer;
c) extraction instructions to retrieve a log on the first computer of incoming connections and outgoing connections;
d) filtering instructions to prefilter the log for specific IDs;
e) mapping instructions to generate a map based on the incoming connections and outgoing connections;
f) storage instructions to store the map, the incoming connections, the outgoing connections, and time and date information for the incoming connections and the outgoing connections;
g) rendering instructions to create a graphical image to visualize the lateral movement on the network based on the map;
h) identification instructions to identify one or more other computers to investigate based on the log; and
i) report instructions to output results regarding lateral movement visualization.

* * * * *